US011981384B2

(12) United States Patent
Kajihara et al.

(10) Patent No.: US 11,981,384 B2
(45) Date of Patent: May 14, 2024

(54) SADDLE-TYPE VEHICLE

(71) Applicant: HONDA MOTOR CO., LTD., Tokyo (JP)

(72) Inventors: Eisuke Kajihara, Wako (JP); Akira Tokito, Wako (JP); Junya Ono, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 1166 days.

(21) Appl. No.: 16/611,232

(22) PCT Filed: May 28, 2018

(86) PCT No.: PCT/JP2018/020385
§ 371 (c)(1),
(2) Date: Nov. 6, 2019

(87) PCT Pub. No.: WO2018/221463
PCT Pub. Date: Dec. 6, 2018

(65) Prior Publication Data
US 2020/0158188 A1 May 21, 2020

(30) Foreign Application Priority Data

May 31, 2017 (JP) ................................. 2017-108539

(51) Int. Cl.
*F16D 25/08* (2006.01)
*B62J 11/00* (2020.01)
(Continued)

(52) U.S. Cl.
CPC ............... *B62J 11/00* (2013.01); *B62K 11/14* (2013.01); *B62K 21/12* (2013.01); *F16D 25/08* (2013.01);
(Continued)

(58) Field of Classification Search
CPC ........ B62K 11/04; B62K 11/14; B62K 23/02; B62K 23/04; B62K 23/06; B62K 23/08;
(Continued)

(56) References Cited

U.S. PATENT DOCUMENTS 4,998,609 A * 3/1991 Nix .......................... F16D 25/12
192/85.48
5,135,091 A * 8/1992 Albers .................. F16D 48/066
192/85.48
(Continued)

FOREIGN PATENT DOCUMENTS

JP 59-185430 12/1984
JP 61-003187 1/1986
(Continued)

OTHER PUBLICATIONS

International Search Report and Written Opinion for International Application Serial No. PCT/JP2018/020385 dated Aug. 14, 2018, 9 pages.
(Continued)

*Primary Examiner* — Anne Marie M Boehler
(74) *Attorney, Agent, or Firm* — Amin, Turoy & Watson, LLP

(57) ABSTRACT

A saddle-type vehicle includes a gearbox having a clutch operated by actuation of a slave cylinder, a hydraulic actuator having a master cylinder configured to generate a hydraulic pressure in a working fluid, a hydraulic valve unit configured to control transmission of the hydraulic pressure generated by the master cylinder to the slave cylinder, a master-side connecting pipeline, and a slave-side connecting pipeline, wherein the hydraulic valve unit Is disposed at a position closer to the slave cylinder than the hydraulic actuator.

7 Claims, 15 Drawing Sheets

(51) Int. Cl.
  *B62J 11/16* (2020.01)
  *B62K 11/14* (2006.01)
  *B62K 21/12* (2006.01)
  *B62K 23/06* (2006.01)
  *B62J 45/412* (2020.01)
  *B62J 45/413* (2020.01)

(52) U.S. Cl.
  CPC .............. *B62J 11/16* (2020.02); *B62J 45/412* (2020.02); *B62J 45/413* (2020.02); *B62K 23/06* (2013.01)

(58) Field of Classification Search
  CPC . B62J 11/16; B62M 7/02; F16D 25/08; F16D 25/14; F16D 2025/081
  See application file for complete search history.

(56) References Cited

U.S. PATENT DOCUMENTS

| | | | |
|---|---|---|---|
| 7,380,630 B2* | 6/2008 | Yamada | B62M 25/00 |
| | | | 180/230 |
| 8,302,755 B2 | 11/2012 | Hayakawa et al. | |
| 8,360,930 B2 | 1/2013 | Kobayashi et al. | |
| 8,782,636 B2* | 7/2014 | Hatori | G06F 8/65 |
| | | | 717/176 |
| 9,803,705 B2* | 10/2017 | Heubner | F16D 25/12 |
| 10,167,042 B2* | 1/2019 | Kajihara | F16D 48/06 |
| 2008/0060900 A1 | 3/2008 | Pick | |
| 2009/0266671 A1 | 10/2009 | Hayakawa | |
| 2016/0348743 A1 | 12/2016 | Buchanan et al. | |

FOREIGN PATENT DOCUMENTS

| | | |
|---|---|---|
| JP | 05-044736 | 2/1993 |
| JP | 05-500999 | 2/1993 |
| JP | 05-508207 | 11/1993 |
| JP | 2006-117174 | 5/2006 |
| JP | 2011-075030 | 4/2011 |
| JP | 2013-177925 | 9/2013 |
| JP | 2015-078764 | 4/2015 |
| JP | 2016-113065 | 6/2016 |
| JP | 2016-193658 | 11/2016 |
| WO | 91/10839 | 7/1991 |

OTHER PUBLICATIONS

Indian Office Action for Indian Patent Application No. 201917046315 dated Dec. 2, 2020.
Extended European Search Report for European Patent Application No. 18809654.9 dated May 14, 2020.
Japanese Notice of Allowance for Japanese Patent Application No. 2019-521209 dated May 26, 2020.

* cited by examiner

SADDLE-TYPE VEHICLE

TECHNICAL FIELD

The present invention relates to a saddle-type vehicle.

Priority is claimed on Japanese Patent Application No. 2017-108539, filed May 31, 2017, the content of which is incorporated herein by reference.

BACKGROUND ART

In a gearbox used in a motorcycle or the like, a so-called semi-automatic gear shift system in which a gear shift operation of a gearbox is performed by a driver and a connection/disconnection operation of a clutch of the gearbox is automatically performed is known (for example, see Patent Literature 1). The gear shift system in Patent Literature 1 includes a hydraulic pressure generating apparatus for generating a hydraulic pressure in a working fluid, a slave cylinder configured to connect or disconnect a clutch using the hydraulic pressure generated by the hydraulic pressure generating apparatus, and a hydraulic pressure control device configured to control the hydraulic pressure transmitted from the hydraulic pressure generating apparatus to the slave cylinder.

CITATION LIST

Patent Literature

Patent Literature 1

Japanese Unexamined Patent Application, First Publication No. 2011-75030

SUMMARY OF INVENTION

Technical Problem

Incidentally, in the related art, when a driver performs a gear shift operation of a gearbox or when control of adjusting a hydraulic pressure is performed using a hydraulic pressure control device, it is desired that a slave cylinder can be driven with an excellent response.

An aspect of the present invention is directed to providing a saddle-type vehicle capable of enhancing operational responsiveness in hydraulic pressure control of a clutch.

Solution to Problem (1) A saddle-type vehicle according to an aspect of the present invention includes a gearbox having a clutch operated by actuation of a slave cylinder; a hydraulic actuator having a master cylinder configured to generate a hydraulic pressure in a working fluid; a hydraulic valve unit configured to control transmission of the hydraulic pressure generated by the master cylinder to the slave cylinder; a master-side connecting pipeline configured to connect the master cylinder and the hydraulic valve unit; and a slave-side connecting pipeline configured to connect the hydraulic valve unit and the slave cylinder, wherein the hydraulic valve unit is disposed at a position closer to the slave cylinder than the hydraulic actuator.

(2) In the aspect of the above-mentioned (1), the slave-side connecting pipeline may be shorter than the master-side connecting pipeline.

(3) In the aspect of the above-mentioned (1) or (2), the master-side connecting pipeline may be formed of a metal-based material, and the slave-side connecting pipeline may be formed of a rubber-based material.

(4) In the aspect of any one of the above-mentioned (1) to (3), the saddle-type vehicle may include an engine continuous with a front side of the gearbox, wherein the hydraulic valve unit is disposed behind a cylinder of the engine and above the gearbox.

(5) In the aspect of any one of the above-mentioned (1) to (4), the hydraulic actuator may be disposed so as to overlap a head pipe, which is provided on a front end portion of the vehicle body frame, in at least one of an upward/downward direction and a forward/rearward direction.

(6) In the aspect of the above-mentioned (5), the saddle-type vehicle may further include a reservoir tank connected to the master cylinder and in which the working fluid is accumulated, wherein the reservoir tank may be attached to a steering handle provided to be pivotable with respect to the vehicle body frame.

(7) In the aspect of the above-mentioned (6), the reservoir tank may be attached to a left half section of the steering handle.

(8) In the aspect of the above-mentioned (6) or (7), a reserve pipeline configured to connect the reservoir tank and the hydraulic actuator may be shorter than the master-side connecting pipeline.

Advantageous Effects of Invention

According to the aspect of the above-mentioned (1), since the hydraulic valve unit is disposed at a position closer to the slave cylinder than the hydraulic actuator, the hydraulic pressure controlled by the hydraulic valve unit can be rapidly transmitted to the slave cylinder, and operational responsiveness in hydraulic pressure control of the clutch can be increased. In addition, since the hydraulic valve unit and the hydraulic actuator are separated from each other, a degree of freedom in disposition of the hydraulic valve unit and the hydraulic actuator can be increased.

According to the aspect of the above-mentioned (2), since the slave-side connecting pipeline is shorter than the master-side connecting pipeline, the hydraulic pressure controlled by the hydraulic valve unit can be rapidly transmitted to the slave cylinder, and operational responsiveness in hydraulic pressure control of the clutch can be increased.

According to the aspect of the above-mentioned (3), since the slave-side connecting pipeline is formed of the rubber-based material, when the hydraulic pressure of the working fluid has decreased, the hydraulic pressure can be immediately increased as the slave-side connecting pipeline contracts, and the hydraulic pressure can be maintained. In addition, since the master-side connecting pipeline that is relatively long is formed of the metal-based material, loss in hydraulic pressure transmission due to expansion of the pipeline can be minimized.

According to the aspect of the above-mentioned (4), since the hydraulic valve unit is disposed behind the cylinder and above the gearbox, the hydraulic valve unit can be efficiently disposed at a position close to the slave cylinder while effectively using an available space around the engine.

According to the aspect of the above-mentioned (5), since the hydraulic actuator is disposed in the section surrounding the head pipe, the hydraulic actuator can be efficiently disposed while effectively using the available space formed around the head pipe.

According to the aspect of the above-mentioned (6), since the reservoir tank is attached to the steering handle, the reservoir tank becomes closer to the driver's field of view, and for example, the amount of the working fluid can be easily seen, and maintenance properties can be improved.

According to the aspect of the above-mentioned (7), since the reservoir tank is attached to the left half section of the steering handle, the reservoir tank can be efficiently disposed by effectively using the space in which the clutch lever or the like for a manual operation is disposed in the case of the vehicle in which the clutch is manually operated.

According to the aspect of the above-mentioned (8), since the reserve pipeline is shorter than the master-side connecting pipeline, appearance characteristics can be improved by reducing the length of the reserve pipeline.

DESCRIPTION OF EMBODIMENTS

Figure 1:
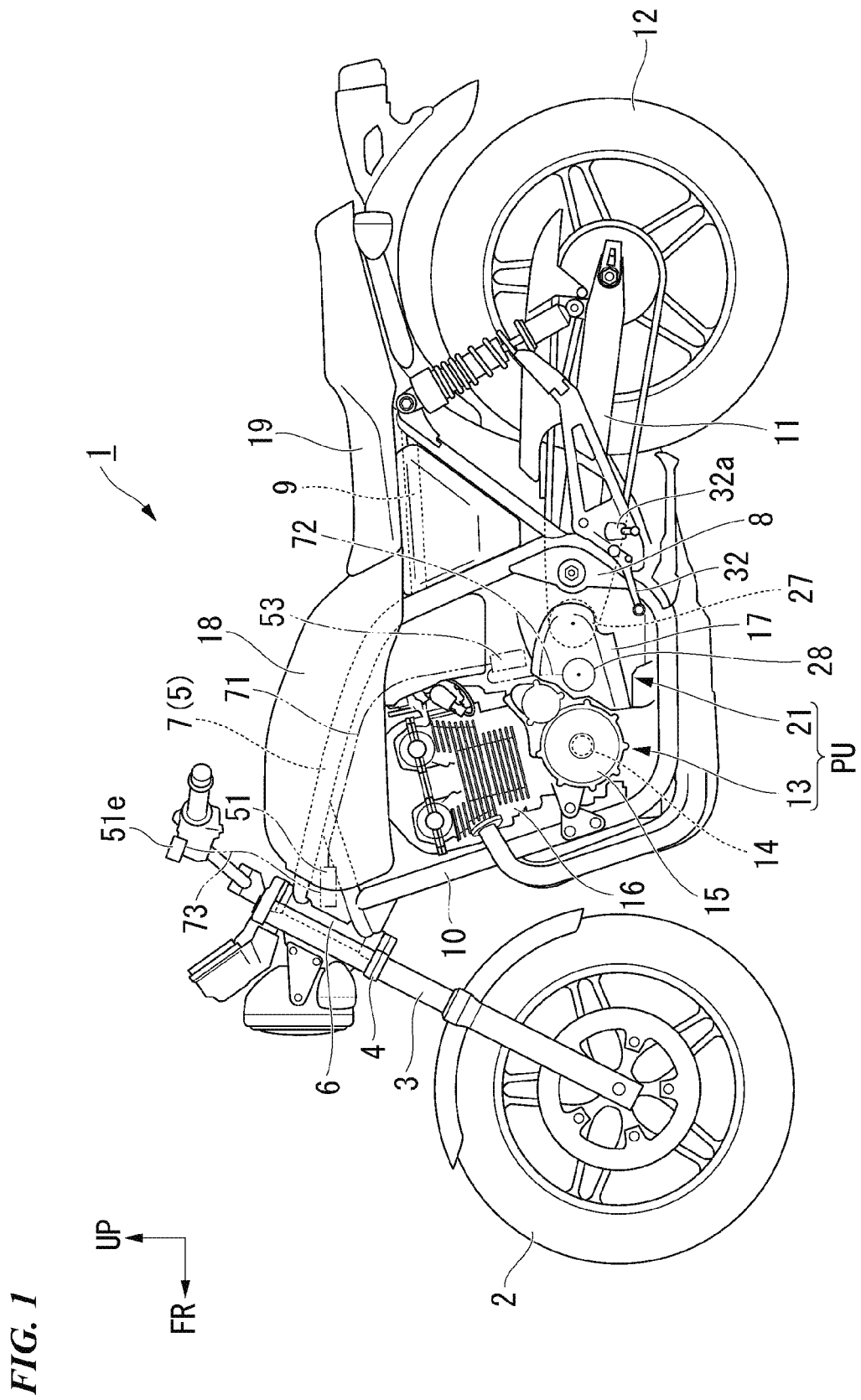
FIG. 1 is a left side view of a motorcycle according to an embodiment of the present invention.

Hereinafter, an embodiment of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle.

As shown in FIG. 1, the embodiment is applied to a motorcycle 1 that is a saddle-type vehicle. A front wheel 2 of the motorcycle 1 is supported by lower end portions of a pair of left and right front forks 3.

Upper sections of the left and right front forks 3 are supported by a head pipe 6 of a front end portion of a vehicle body frame 5 via a steering stem 4. A bar type steering handle 4a is attached onto a top bridge of the steering stem 4.

The vehicle body frame 5 includes the head pipe 6, main tubes 7 extending downward and rearward from an upper section of the head pipe 6 at a center in a vehicle width direction (a leftward/rightward direction), left and right pivot frames 8 continuous with lower sides of rear end portions of the main tubes 7, left and right down tubes 10 extending downward and rearward from a lower section of the head pipe 6 at a steeper angle than that of the main tubes 7, and a seat frame 9 continuous with rear sides of the main tubes 7 and the left and right pivot frames 8. A front end portion of a swing arm 11 is swingably axially supported by the left and right pivot frames 8. A rear wheel 12 of the motorcycle 1 is supported by a rear end portion of the swing arm 11.

A fuel tank 18 is supported above the left and right main tubes 7. A seat 19 is supported behind the fuel tank 18 and above the seat frame 9.

A power unit PU that is a prime mover of the motorcycle 1 is suspended below the left and right main tubes 7. The power unit PU is linked to the rear wheel 12 via, for example, a chain type transmission mechanism.

The power unit PU integrally has an engine 13 disposed in front thereof and a gearbox 21 disposed behind thereof. The engine 13 is a multi-cylinder engine having, for example, a rotary shaft of a crankshaft 14 that is aligned in the leftward/rightward direction (the vehicle width direction). The engine 13 has a cylinder 16 that stands on a front upper side of a crank case 15. A rear section of the crank case 15 is made as a gearbox case 17 configured to accommodate the gearbox 21.

Figure 2:
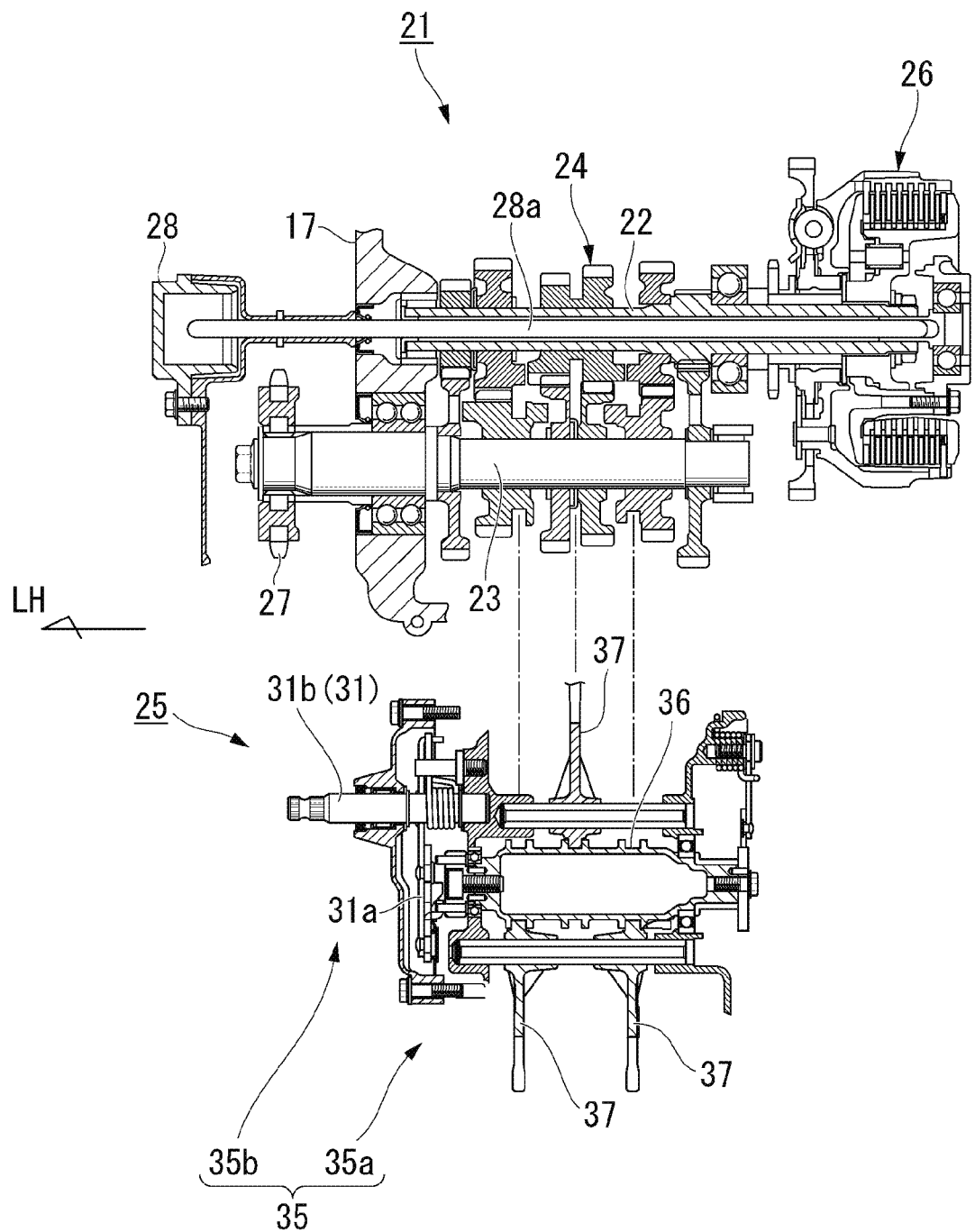
FIG. 2 is a cross-sectional view of a gearbox and a change mechanism of the motorcycle.

As shown in FIG. 2, the gearbox 21 is a stepped transmission having a main shaft 22 and a counter shaft 23, and a shifting gear group 24 that is provided across both of the shafts 22 and 23. The counter shaft 23 configures the gearbox 21 and an output shaft of the power unit PU. An end portion of the counter shaft 23 protrudes toward a side to the rear to the left of the crank case 15, and is connected to the rear wheel 12 via the chain type transmission mechanism.

Figure 3:
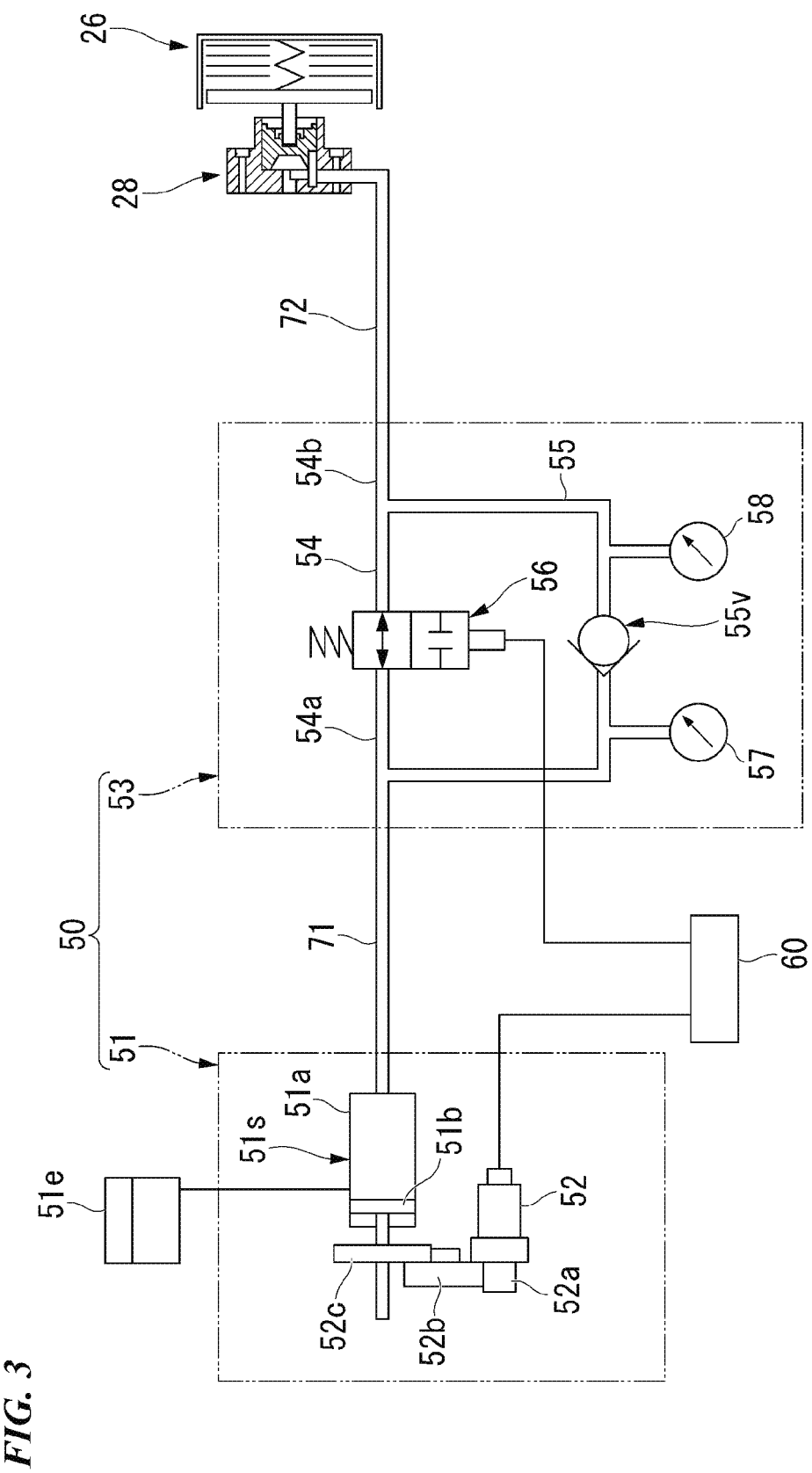
FIG. 3 is a view for schematically explaining a clutch actuating system including a clutch actuator.

Referring also to FIG. 3, the main shaft 22 and the counter shaft 23 of the gearbox 21 are disposed to be arranged in front of and at behind each other behind the crankshaft 14. A clutch 26 operated by a clutch actuator 50 is disposed coaxially with a right end portion of the main shaft 22. The clutch 26 is, for example, a wet multi-disk clutch, a so-called normally open clutch. That is, the clutch 26 is in a connected state in which power can be transmitted according to supply of a hydraulic pressure from the clutch actuator 50, and returns to a disconnected state in which power cannot be transmitted when a hydraulic pressure from the clutch actuator 50 is not supplied.

Referring to FIG. 2, rotational power of the crankshaft 14 is transmitted to the main shaft 22 via the clutch 26, and transmitted to the counter shaft 23 from the main shaft 22 via an arbitrary gear pair of the shifting gear group 24. A drive sprocket 27 of the chain type transmission mechanism is attached to a left end portion of the counter shaft 23 protruding toward a side to the rear to the left of the crank case 15.

A change mechanism 25 configured to switch the gear pair of the shifting gear group 24 is accommodated at behind and above the gearbox 21. The change mechanism 25 operates a plurality of shift forks 37 according to a pattern of a lead groove formed in an outer circumference thereof and switches the gear pair used for power transmission between the shafts 22 and 23 in the shifting gear group 24 according to pivoting movement of a shift drum 36 having a hollow cylindrical shape parallel to the shafts 22 and 23.

The change mechanism 25 has a shift spindle 31 parallel to the shift drum 36.

Upon pivoting movement of the shift spindle 31, a shift arm 31a fixed to the shift spindle 31 pivots the shift drum 36, moves the shift forks 37 in the axial direction according to the pattern of the lead groove, and switches a gear pair configured to transmit power in the shifting gear group 24 (i.e., switches a gear range).

The shift spindle 31 has an outer shaft section 31b that protrudes toward a side outward (a left side) from the crank case 15 in the vehicle width direction so as to make the change mechanism 25 operatable. A shift load sensor 42 (see FIG. 4) is coaxially attached to the outer shaft section 31b of the shift spindle 31. A shift pedal 32 operated by a driver's foot is connected to the outer shaft section 31b of the shift spindle 31 (or a pivot shaft of the shift load sensor 42) via a link rod (not shown).

As shown in FIG. 1, the shift pedal 32 has a front end portion that can be vertically swingably supported by a lower section of the crank case 15 via a shaft extending in the leftward/rightward direction. A pedal section configured to hook a driver's feet placed on a step 32a is provided on the shift pedal 32.

As shown in FIG. 2, a shift change apparatus 35 including the shift pedal 32 and the change mechanism 25 and configured to switch a transmission gear of the gearbox 21 is configured. In the shift change apparatus 35, an assembly (the shift drum 36, the shift forks 37, and the like) configured to switch the gear range of the gearbox 21 in the gearbox case 17 is referred to as a gear shift operation section 35a, and an assembly (the shift spindle 31, the shift arm 31a, and the like), into which a gear shift operation to the shift pedal 32 is input, configured to pivot around a shaft of the shift spindle 31 and transmit the pivoting movement to the gear shift operation section 35a is referred to as a gear shift operation receiving section 35b.

Here, the motorcycle 1 employs a so-called semi-automatic gear shift system in which a gear shift operation of the gearbox 21 (a foot operation of the shift pedal 32) is performed by a driver, and a connection/disconnection operation of the clutch 26 is automatically performed by electric control according to an operation of the shift pedal 32.

Figure 4:
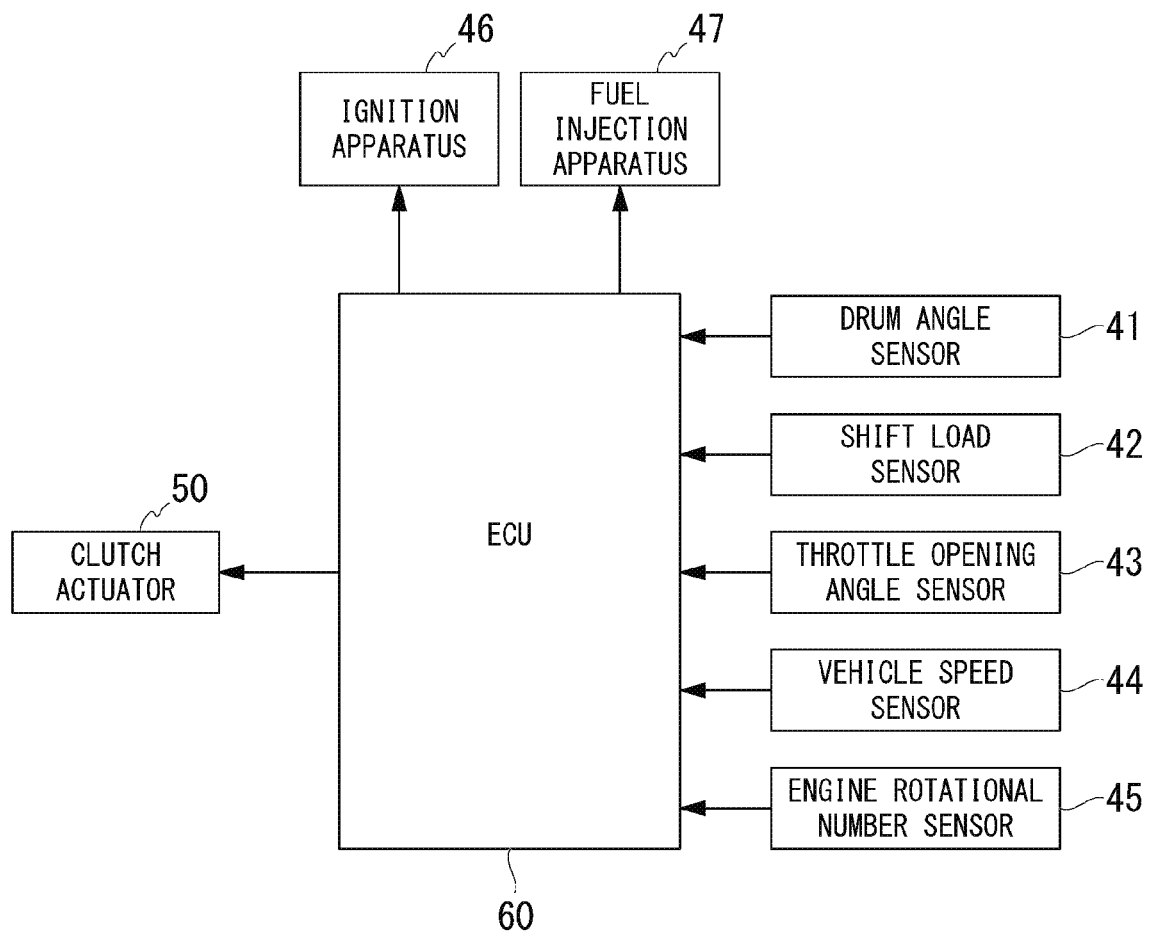
FIG. 4 is a block diagram of a gear shift system.

As shown in FIG. 4, the gear shift system includes the clutch actuator 50, an electronic control unit 60 (ECU, a control part) and various sensors 41 to 45.

The ECU 60 controls an operation of the clutch actuator 50 and controls operations of an ignition apparatus 46 and a fuel injection apparatus 47 on the basis of detection information from a drum angle sensor (a gear position sensor) 41 configured to detect a gear range from a pivot angle of the shift drum 36 and a shift load sensor (a torque sensor) 42 configured to detect an operation torque input to the shift spindle 31, and various types of vehicle state detection information or the like from a throttle opening angle sensor 43, a vehicle speed sensor 44, an engine rotational speed sensor 45, and the like. Detection information from hydraulic pressure sensors 57 and 58 of the clutch actuator 50 is also input to the ECU 60.

Referring also to FIG. 3, the clutch actuator 50 can control a liquid pressure that connects or disconnects the clutch 26 by controlling the operation through the ECU 60. The clutch actuator 50 includes a hydraulic actuator 51 and a hydraulic valve unit 53.

The hydraulic actuator 51 includes an electric motor 52 (hereinafter, simply referred to as the motor 52) serving as a drive source, and a master cylinder 51s driven by the motor 52.

The master cylinder 51s can stroke a piston 51b in a cylinder main body 51a by driving the motor 52, and supply or discharge a working fluid in the cylinder main body 51a with respect to a slave cylinder 28. Reference numeral 51e in the drawings designates a reservoir tank connected to the master cylinder 51s.

The piston 51b of the master cylinder 51s is connected to a drive shaft 52a of the motor 52 via a transmission gear 52b and a conversion mechanism 52c. Since the conversion mechanism 52c converts rotational movement of the drive shaft 52a and the transmission gear 52b into stroke movement of the piston 51b, for example, a ball-screw mechanism is used.

The hydraulic valve unit 53 is provided between the master cylinder Ms and the slave cylinder 28. The hydraulic valve unit 53 includes a main oil passage 54, a valve mechanism (a solenoid valve 56), a bypass oil passage 55, a one-way valve 55v, and the hydraulic pressure sensors 57 and 58.

The main oil passage 54 is formed to bring a side of the master cylinder 51s and a side of the slave cylinder 28 communicate with each other. The solenoid valve 56 opens or shuts off the main oil passage 54. The solenoid valve 56 is a so-called normally open valve.

The bypass oil passage 55 bypasses the solenoid valve 56 and brings an upstream-side oil passage 54a and a downstream-side oil passage 54b of the main oil passage 54 communicate with each other. The one-way valve 55v is provided on the bypass oil passage 55, causes a working fluid to flow in a direction from the upstream-side oil passage 54a to the downstream-side oil passage 54b, and restricts a flow of the working fluid in a reverse direction.

The hydraulic pressure sensors 57 and 58 detect hydraulic pressures of working fluids on the side of the master cylinder 51s and on the side of the slave cylinder 28 with the solenoid valve 56 sandwiched therebetween.

As shown in FIG. 2, the slave cylinder 28 is coaxially disposed on a left side of the main shaft 22. The slave cylinder 28 pushes a push rod 28a passing through the main shaft 22 rightward upon supply of a hydraulic pressure from the clutch actuator 50. The slave cylinder 28 operates the clutch 26 such that it is brought into a connected state via the push rod 28a by pushing the push rod 28a rightward. The slave cylinder 28 releases pushing of the push rod 28a and returns the clutch 26 to the disconnected state when the hydraulic pressure is not supplied.

While supply of the hydraulic pressure needs to be continued in order to maintain the clutch 26 in a connected state, electric power is consumed to that extent. Here, as shown in FIG. 3, the solenoid valve 56 is provided on the hydraulic valve unit 53 of the clutch actuator 50, and the solenoid valve 56 is closed after supply of the hydraulic pressure toward the clutch 26. Accordingly, energy consumption is minimized using a configuration of maintaining the hydraulic pressure supplied toward the clutch 26 and supplementing the hydraulic pressure to an extent of a decrease in pressure (recharging to an extent of leakage).

Next, actions of the clutch control system will be described with reference to the graph in FIG. 5. In the graph in FIG. 5, a vertical axis represents a supplied hydraulic pressure detected by the hydraulic pressure sensor 58, and a horizontal axis represents an elapsed time.

Upon stopping (idling) of the motorcycle 1, both of the motor 52 and the solenoid valve 56 controlled by the ECU 60 are in a state in which supply of electric power is shut off. That is, the motor 52 is in a stopped state and the solenoid valve 56 is in an open state. Here, the side of the slave cylinder 28 (a downstream side) enters a low pressure state that is lower than a touch point hydraulic pressure TP, and the clutch 26 is in an unengaged state (a disconnected state, a released state). This state corresponds to an area A in FIG. 5.

Upon starting of the motorcycle 1, when a rotational speed of the engine 13 is increased, electric power is supplied to the motor 52, and a hydraulic pressure is supplied to the slave cylinder 28 from the master cylinder 51s via the solenoid valve 56 in an open state. When the hydraulic pressure on the side of the slave cylinder 28 (the downstream side) is increased to the touch point hydraulic pressure TP or more, engaging of the clutch 26 is started, and the clutch 26 is in a half clutch state in which power is partially transmittable. Accordingly, smooth starting of the motorcycle 1 becomes possible. This state corresponds to an area B in FIG. 5.

Eventually, when the hydraulic pressure on the side of the slave cylinder 28 (the downstream side) reaches a lower limit holding hydraulic pressure LP, engaging of the clutch 26 is terminated, and a driving force of the engine 13 is entirely transmitted to the gearbox 21. This state corresponds to an area C in FIG. 5.

Then, when the hydraulic pressure on the side of the slave cylinder 28 (the downstream side) reaches an upper limit holding hydraulic pressure HP, supply of electric power to the motor 52 is stopped and generation of the hydraulic pressure is stopped while electric power is supplied to the solenoid valve 56 and the solenoid valve 56 is closed. That is, while an upstream side becomes a low pressure state as the hydraulic pressure is released, and a downstream side is maintained at a high pressure state (the upper limit holding hydraulic pressure HP). Accordingly, the clutch 26 can be maintained in a engaged state while the master cylinder 51s does not generate a hydraulic pressure, and electric power consumption can be minimized while enabling the motorcycle 1 to travel.

Figure 5:
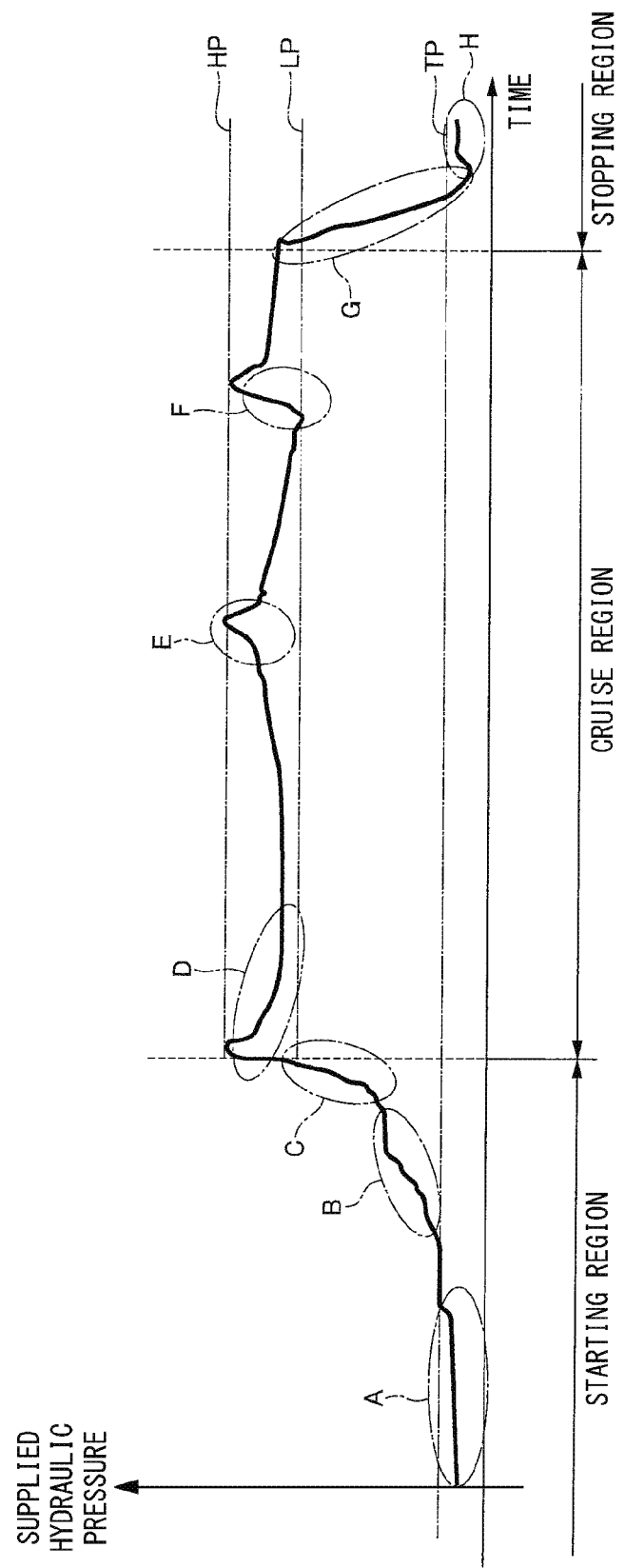
FIG. 5 is a graph showing variation in supplied hydraulic pressure of the clutch actuator.

Even in a state in which the solenoid valve 56 is closed, the hydraulic pressure on the downstream side is gradually decreased (leaked) like an area D in FIG. 5 due to causes such as a leakage of the hydraulic pressure or a decrease in temperature due to deformation or the like of seals of the solenoid valve 56 and the one-way valve 55v. Meanwhile, like an area E in FIG. 5, there is a case in which the hydraulic pressure on the downstream side may be increased due to an increase in temperature or the like. Slight hydraulic pressure fluctuation on the downstream side can also be absorbed by an accumulator 61, and there is no increase in electric power consumption due to operations of the motor 52 and the solenoid valve 56 on every hydraulic pressure fluctuation.

Like the area E in FIG. 5, when the hydraulic pressure on the downstream side is increased to the upper limit holding hydraulic pressure HP, the solenoid valve 56 is gradually opened and the hydraulic pressure on the downstream side is relieved to an upstream side due to a decrease in supply of electric power to the solenoid valve 56 or the like.

Like the area F in FIG. 5, when the hydraulic pressure on the downstream side is decreased to the lower limit holding hydraulic pressure LP, supply of electric power to the motor 52 is started while the solenoid valve 56 is closed, and the hydraulic pressure on the upstream side is increased. When the hydraulic pressure on the upstream side exceeds the hydraulic pressure on the downstream side, the hydraulic pressure is supplemented (recharged) to the downstream side via the bypass oil passage 55 and the one-way valve 55v. When the hydraulic pressure on the downstream side reaches the upper limit holding hydraulic pressure HP, supply of electric power to the motor 52 is stopped and generation of the hydraulic pressure is stopped. Accordingly, the hydraulic pressure on the downstream side is maintained between the upper limit holding hydraulic pressure HP and the lower limit holding hydraulic pressure LP, and the clutch 26 is maintained in a engaged state.

Upon stopping of the motorcycle 1, supply of electric power to both the motor 52 and the solenoid valve 56 is stopped. Accordingly, the master cylinder 51s stops generation of the hydraulic pressure and stops supply of the hydraulic pressure to the slave cylinder 28. The solenoid valve 56 is in a closed state, and the hydraulic pressure in the downstream-side oil passage 54b is returned to a reservoir tank 51e. Accordingly, the side of the slave cylinder 28 (the downstream side) is a low pressure state that is lower than the touch point hydraulic pressure TP, and the clutch 26 is in an unengaged state. This state corresponds to areas G and H in FIG. 5.

Next, a specific configuration of the hydraulic valve unit 53 will be described.

As shown in FIGS. 6 to 11, the hydraulic valve unit 53 includes a valve body 53a. The valve body 53a forms a housing of the hydraulic valve unit 53, in which the main oil passage 54 and the bypass oil passage 55 are formed.

Figure 6:
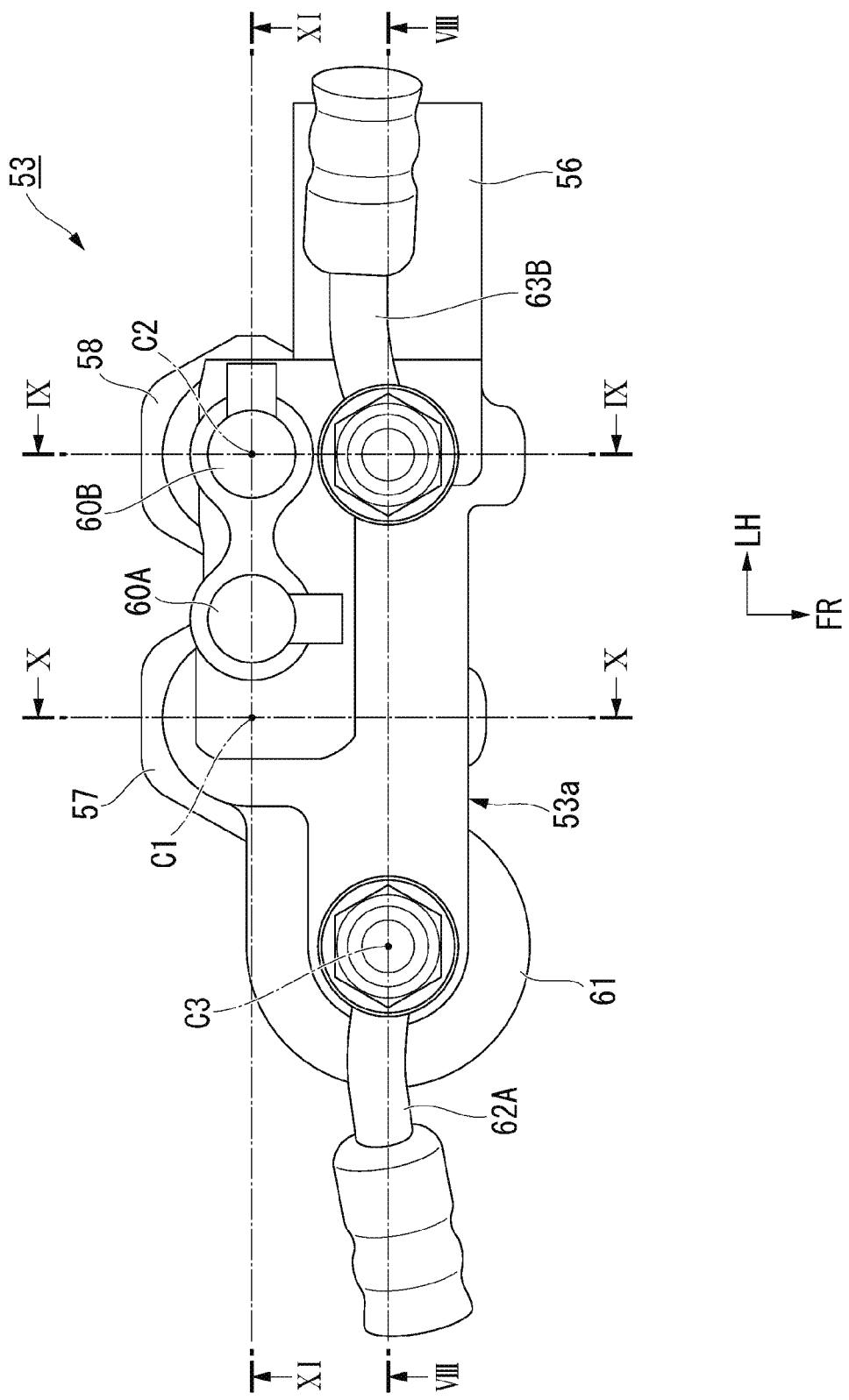
FIG. 6 is a plan view of a hydraulic valve unit of the clutch actuator.
Figure 7:
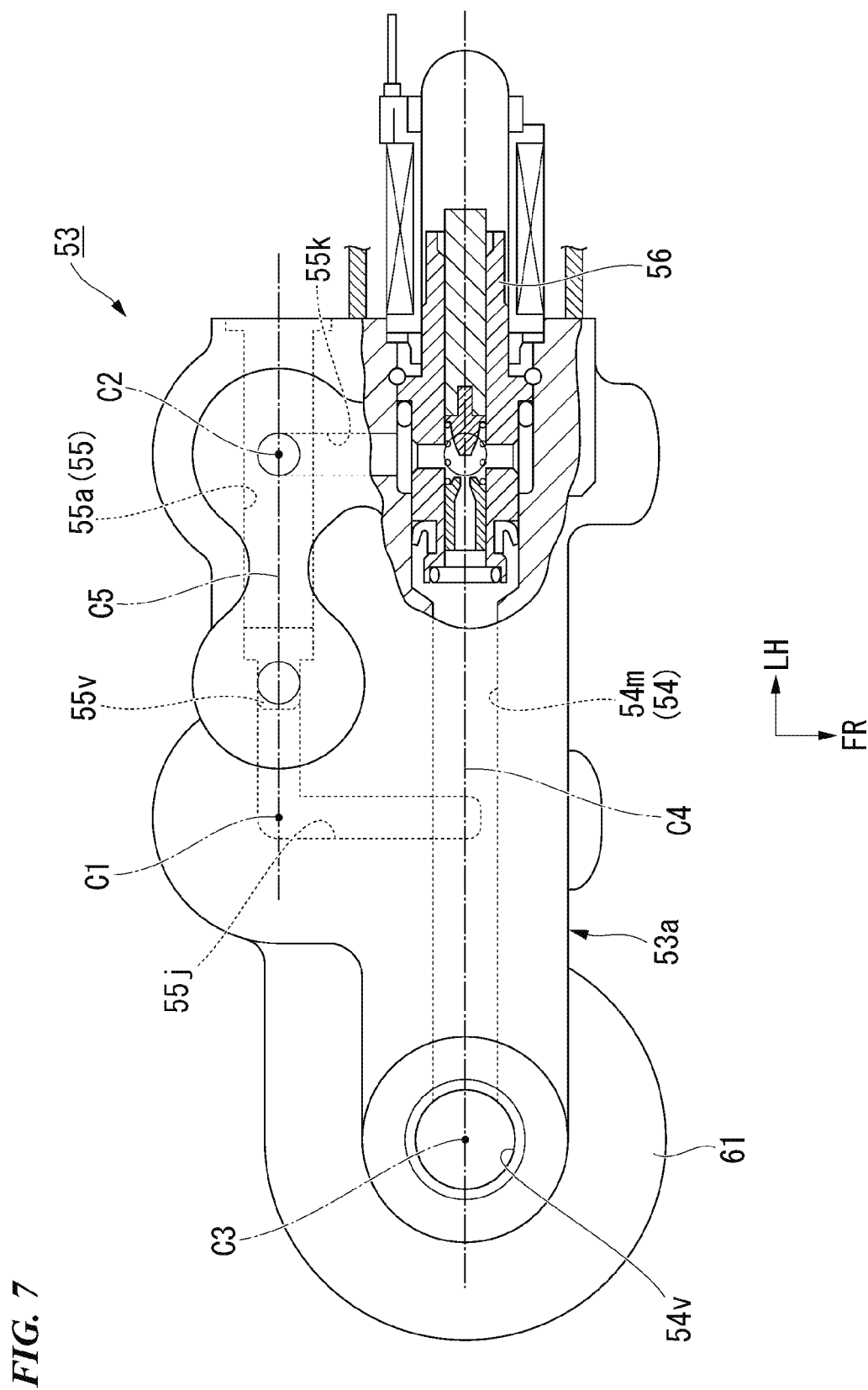
FIG. 7 is a plan view including a cross section of a part of the hydraulic valve unit.

FIGS. 6 and 7 are plan views showing a state in which the hydraulic valve unit 53 is attached to a predetermined attachment position in a vehicle body of the motorcycle 1 in a plan view. For example, the hydraulic valve unit 53 is disposed behind the cylinder 16 of the engine 13 and above the gearbox 21 (see FIG. 1). In the hydraulic valve unit 53, the main oil passage 54 and the bypass oil passage 55 are disposed in the leftward/rightward direction, and axes C1, C2 and C3 of the hydraulic pressure sensors 57 and 58 and the accumulator 61 are disposed along an inclination of the cylinder 16. FIGS. 6 and 7 show plan views along the axes C1, C2 and C3 of the hydraulic pressure sensors 57 and 58 and the accumulator 61. The hydraulic actuator 51 is disposed behind the head pipe 6.

Figure 8:
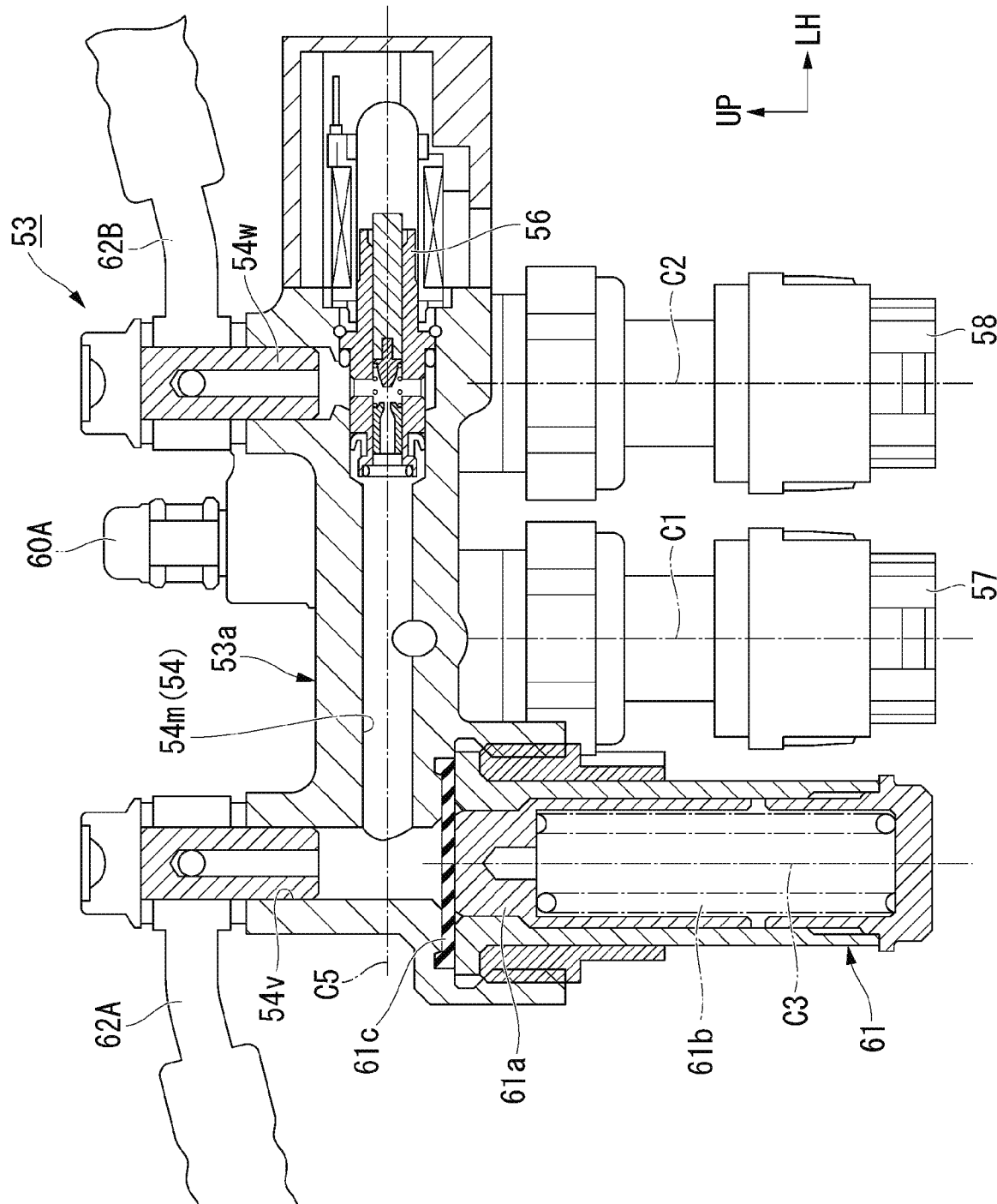
FIG. 8 is a cross-sectional view taken along line VIII-VIII in FIG. 6.

As shown in FIGS. 7 and 8, in a state in which the hydraulic valve unit 53 is attached to a predetermined attachment position of the vehicle body, the main oil passage 54 is formed in a linear shape such that a main section 54m thereof extends in a substantially horizontal direction. Reference character C4 in the drawings designates a central axis in an extension direction of the main section 54m. Standing-up flow paths 54v and 54w standing upward are formed at both end portions of the main section 54m of the main oil passage 54. Banjo members 62A and 62B are connected to the standing-up flow paths 54v and 54w.

Referring together to FIG. 3, the other ends of a master-side connecting pipeline 71 and a slave-side connecting pipeline 72, one ends of which are connected to the master cylinder 51s and the slave cylinder 28, are connected to the banjo members 62A and 62B. The master-side connecting pipeline 71 connects the hydraulic valve unit 53 and the master cylinder 51s of the hydraulic actuator 51. The slave-side connecting pipeline 72 connects the hydraulic valve unit 53 and the slave cylinder 28.

The solenoid valve 56 is provided at an end portion of the main section 54m of the main oil passage 54 on the side of the standing-up flow path 54w.

In the main oil passage 54, the main section 54m and the standing-up flow path 54v become the upstream-side oil passage Ma on the side of the master cylinder 51s with respect to the solenoid valve 56, and the standing-up flow path 54w becomes the downstream-side oil passage 54b on the side of the slave cylinder 28 with respect to the solenoid valve 56.

Meanwhile, the main oil passage 54 shortens the standing-up flow paths 54v and 54w as much as possible, and shortens a length of the oil passage from the banjo member 62A to the banjo member 62B via the main oil passage 54 as much as possible. Accordingly, the hydraulic pressure can be transmitted quickly, and the clutch 26 can be operated with good response.

As shown in FIG. 7, the bypass oil passage 55 has a main section 55a and branch oil passages 55j and 55k. The main section 55a of the bypass oil passage 55 is parallel to the main section 54m of the main oil passage 54, and formed in a linear shape extending in a substantially horizontal direction. Reference character C5 in the drawings designates a central axis in an extension direction of the main section 55a. The main section 55a of the bypass oil passage 55 is disposed parallel to the main oil passage 54 when seen in a plan view in a state in which the valve body 53a is attached to a predetermined attachment position of the vehicle body. Further, as shown in FIGS. 9 and 10, the main section 55a of the bypass oil passage 55 is disposed at a position higher than the main oil passage 54.

The branch oil passages 55j and 55k are formed to connect both end portions of the main section 55a of the bypass oil passage 55 to the main section 54m of the main oil passage 54. The branch oil passages 55j and 55k extend from the main section 54m of the main oil passage 54 in a direction crossing the main oil passage 54.

Figure 9:
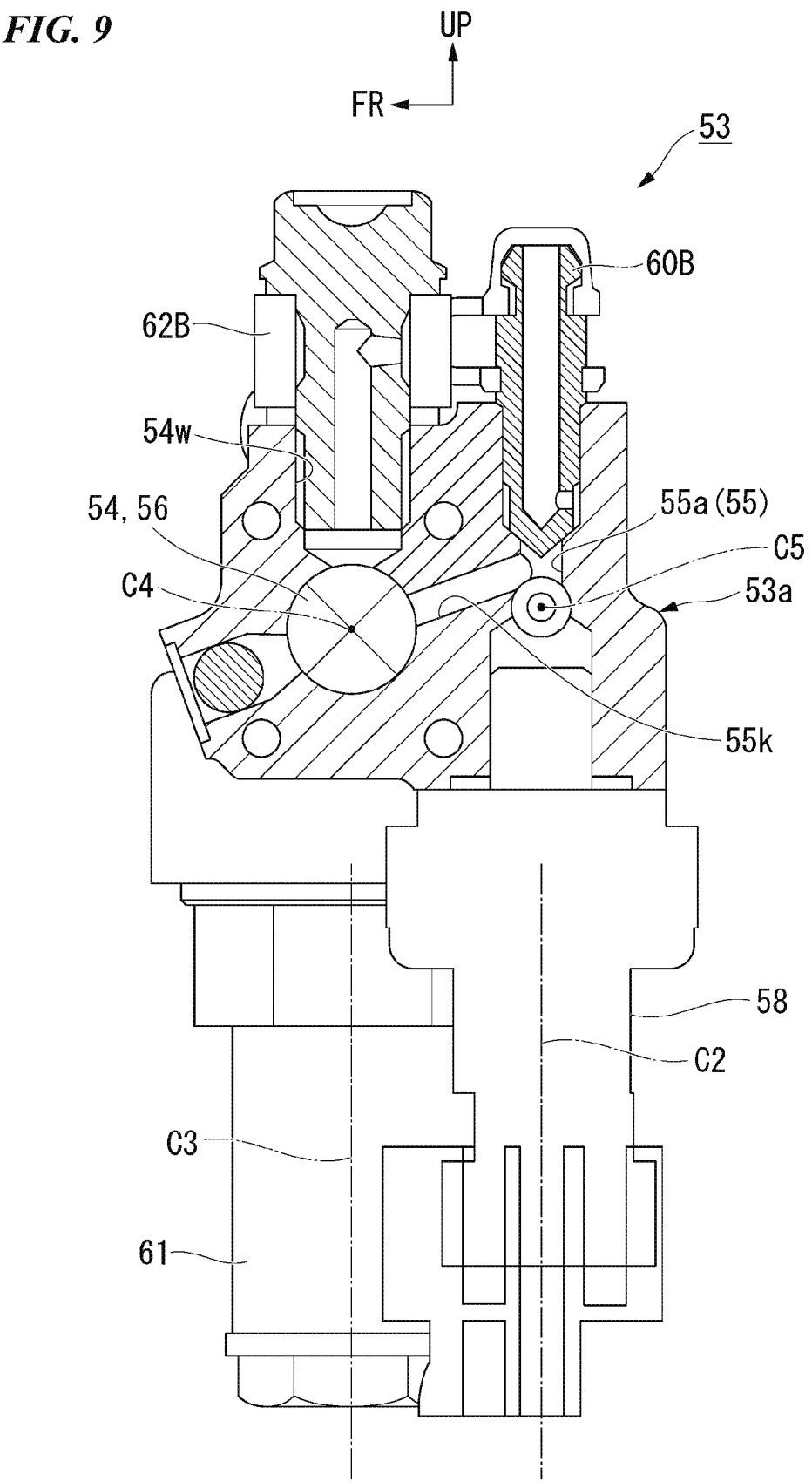
FIG. 9 is a cross-sectional view taken along line IX-IX in FIG. 6.
Figure 10:
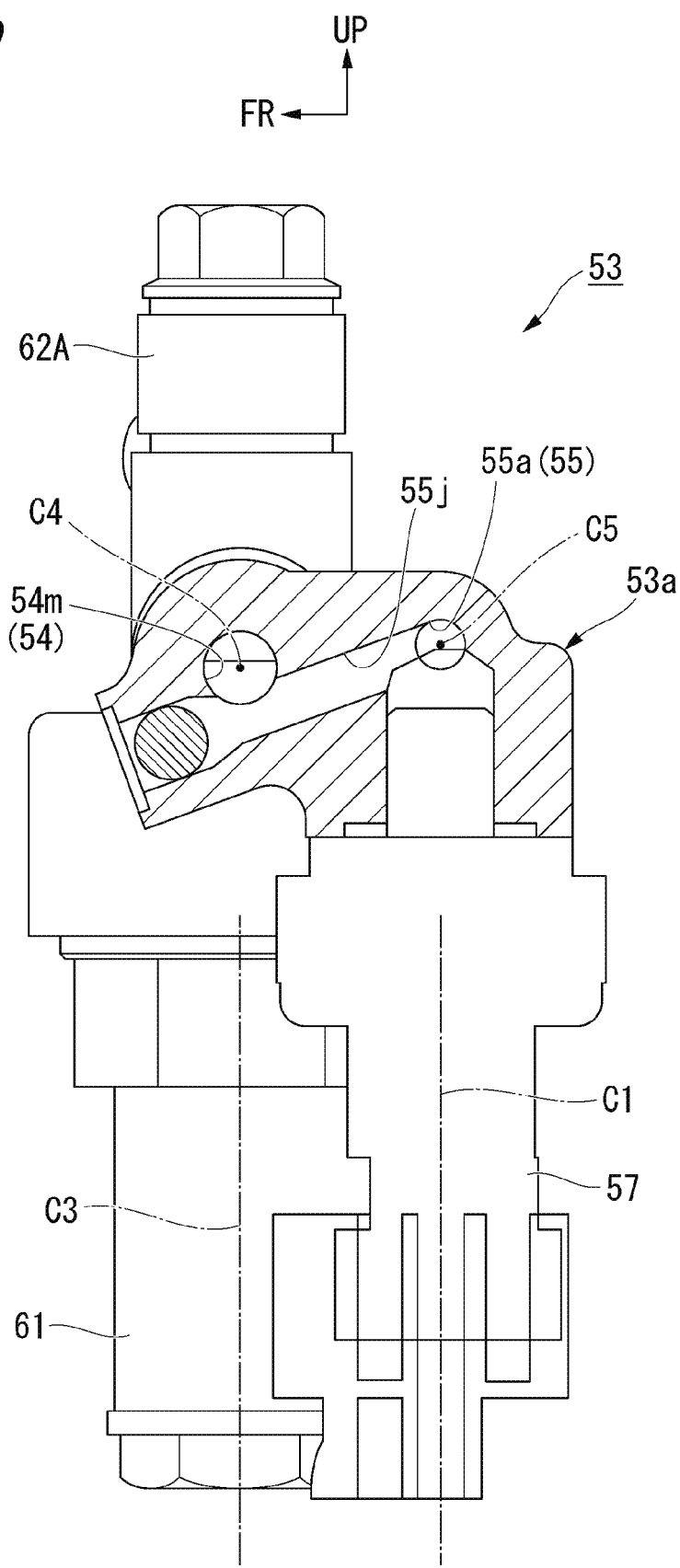
FIG. 10 is a cross-sectional view taken along line X-X in FIG. 6.

Referring together to FIGS. 9 and 10, the branch oil passages 55j and 55k are formed to extend upward obliquely from the side of the main section 54m of the main oil passage 54 toward the main section 55a of the bypass oil passage 55 in a state in which the valve body 53a is attached to a predetermined attachment position of the vehicle body. Portions of the branch oil passages 55j and 55k that open downward obliquely outside the valve body 53a are closed by press-fitting of steel balls.

The hydraulic pressure sensors 57 and 58 are disposed below the main section 55a of the bypass oil passage 55 to extend in the upward/downward direction, and upper end portions of the hydraulic pressure sensors 57 and 58 are connected to the main section 55a. The main section 55a of the bypass oil passage 55 is disposed at a position higher than that of the main oil passage 54, and the branch oil passages 55j and 55k extends upward obliquely toward the main section 55a of the bypass oil passage 55. For this reason, a disposition space of the hydraulic pressure sensors 57 and 58 is easily secured below the main section 55a of the bypass oil passage 55, and contributes to reduction in size of the hydraulic valve unit 53.

Figure 11:
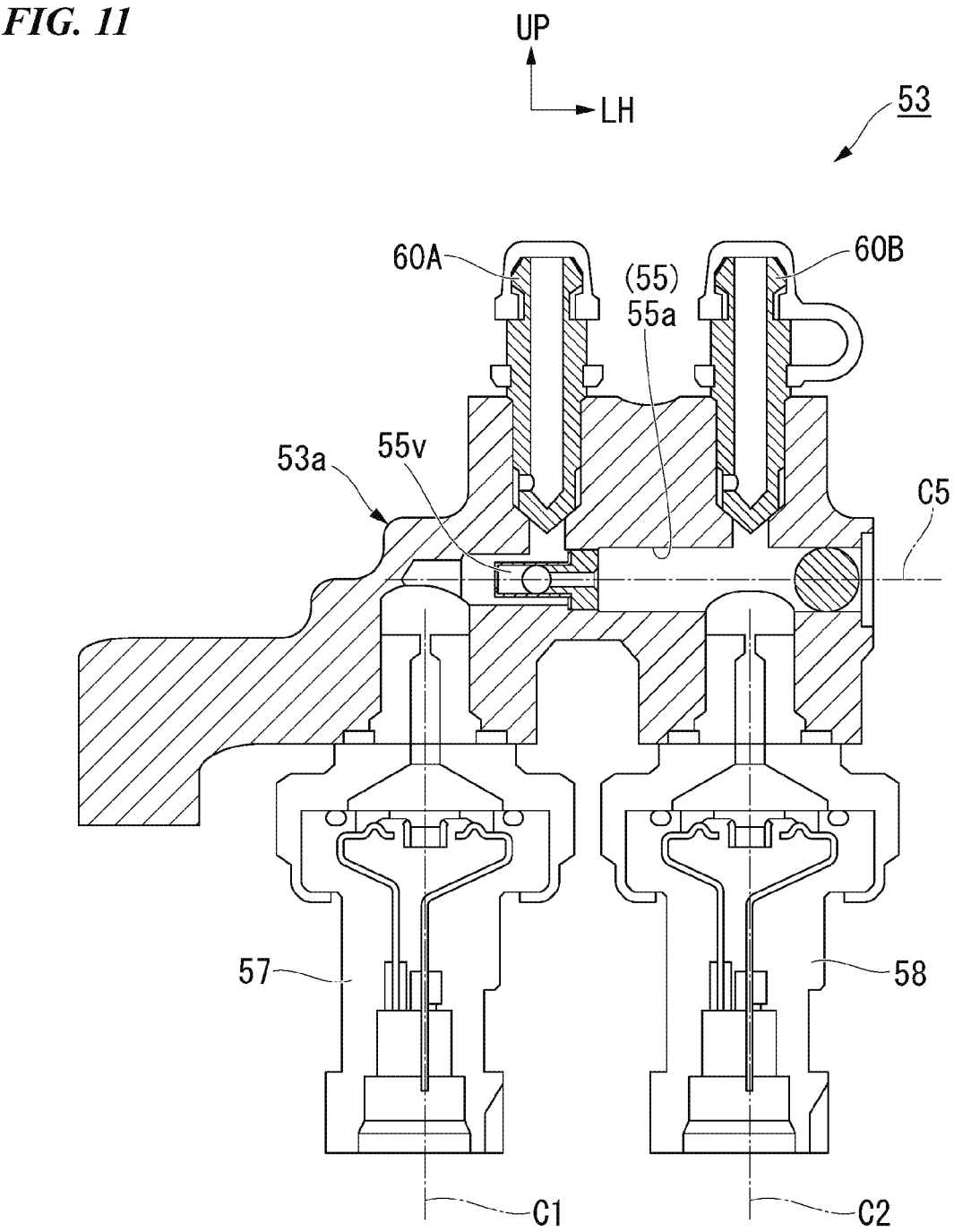
FIG. 11 is a cross-sectional view taken along line XI-XI in FIG. 6.

As shown in FIG. 11, the hydraulic pressure sensors 57 and 58 are provided on the bypass oil passage 55, and disposed upstream and downstream from the one-way valve 55v. Accordingly, the hydraulic pressure sensors 57 and 58 detect hydraulic pressures of the working fluid on the side of the master cylinder 51s and on the side of the slave cylinder 28.

Referring together to FIG. 8, the hydraulic pressure sensors 57 and 58 are provided to be disposed below the main oil passage 54 and the main section 55a of the bypass oil passage 55 in a state in which the valve body 53a is attached to a predetermined attachment position of the vehicle body. Further, the hydraulic pressure sensors 57 and 58 are disposed to be located below the main section 55a of the bypass oil passage 55 disposed at a position higher than that of the main oil passage 54. The hydraulic pressure sensors 57 and 58 are disposed such that the central axes C1 and C2 are directed in the upward/downward direction. A portion of the main section 55a of the bypass oil passage 55 that opens rightward in FIG. 11 outside the valve body 53a is closed by press-fitting of a steel ball. The one-way valve 55v is inserted from the opening portion of the main section 55a before closing of the opening portion.

The hydraulic valve unit 53 further includes the accumulator 61 and bleeder members 60A and 60B.

As shown in FIG. 8, the accumulator 61 is connected to a merging section of the main section 54m and the standing-up flow path 54v of the main oil passage 54. The accumulator 61 has a piston 61a, a coil spring 61b configured to bias the piston 61a toward the main oil passage 54, and a diaphragm 61c configured to separate a side of the piston 61a from the main oil passage 54. The diaphragm 61c of the accumulator 61 is pressed when the hydraulic pressure of the main oil passage 54 is increased. Accordingly, the piston 61a is pushed against an elastic force of the coil spring 61b via the diaphragm 61c, and the accumulator 61 stores the hydraulic pressure. In the accumulator 61, when the hydraulic pressure of the main oil passage 54 is decreased, the piston 61a is moved toward the main oil passage 54 by the elastic force of the coil spring 61b, and the working fluid is returned to the main oil passage 54 to increase the hydraulic pressure and absorb fluctuation of the hydraulic pressure.

Such an accumulator 61 is disposed parallel to the hydraulic pressure sensors 57 and 58 and have the central axis C3 in the upward/downward direction.

As shown in FIG. 11, the bleeder members 60A and 60B are used when an air bleeding operation of bleeding air contained in the working fluid is performed. The bleeder members 60A and 60B are disposed to be located above the bypass oil passage 55 disposed at a position higher than that of the main oil passage 54 in a state in which the valve body 53a is attached to a predetermined attachment position of the vehicle body. Here, the bleeder member 60A is disposed above the one-way valve 55v.

In the hydraulic valve unit 53, when seen in a plan view in a state in which the valve body 53a is attached to a predetermined attachment position of the vehicle body, the main oil passage 54 and the main section 55a of the bypass oil passage 55 are disposed in parallel and close with each other. In addition, the hydraulic pressure sensors 57 and 58, the accumulator 61 and the bleeder members 60A and 60B are disposed to extend in the upward/downward direction. Accordingly, the hydraulic valve unit 53 has a thin compact shape in which a thickness dimension in the vehicle forward/rearward direction is less than a width dimension in the leftward/rightward direction (the vehicle width direction).

Figure 12:
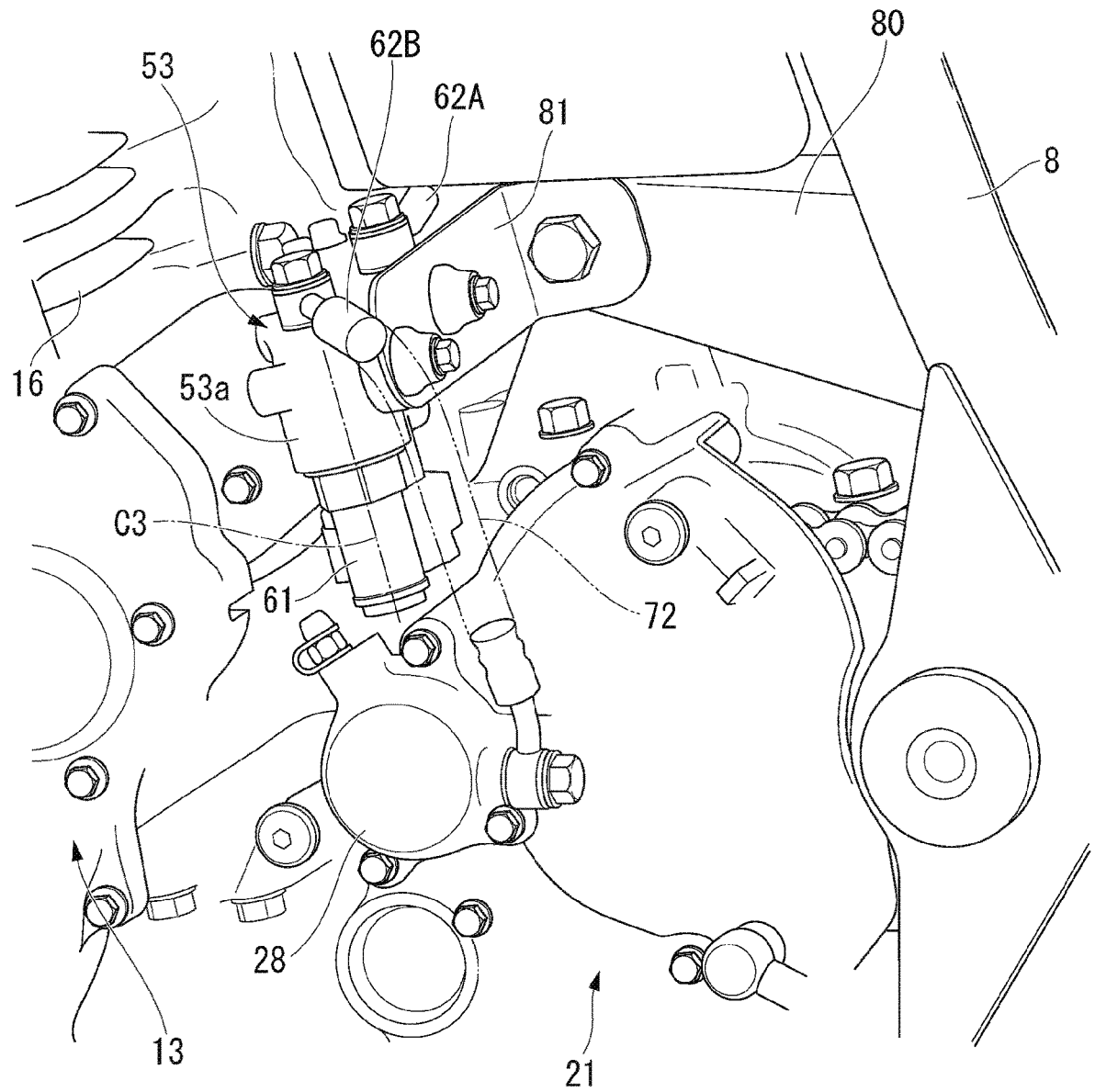
FIG. 12 is a perspective view showing an attachment state of the hydraulic valve unit.

As shown in FIG. 1, the hydraulic valve unit 53 is disposed behind the cylinder 16 of the engine 13 and above the gearbox 21. As shown in FIG. 12, for example, the hydraulic valve unit 53 is supported by a stay (for example, an engine hanger bracket) 80 provided to extend forward from the pivot frame 8 on the left side via an attachment tool 81. A disposition space of the hydraulic valve unit 53 is easily secured at a position behind the cylinder 16 and above the gearbox 21 in the case of a parallel type engine 13 having a plurality of cylinders.

Figure 13:
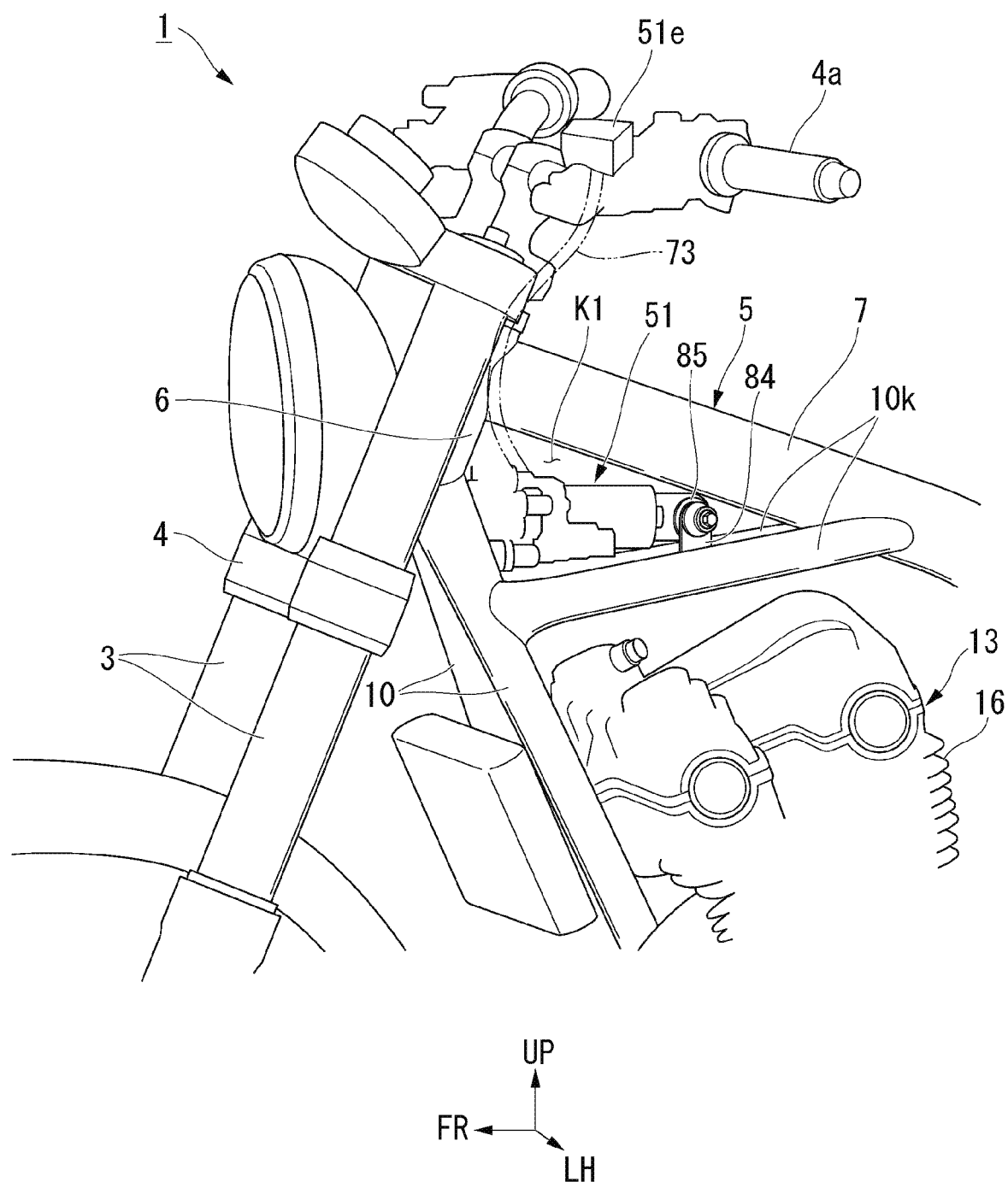
FIG. 13 is a perspective view showing an attachment state of a hydraulic actuator and a reservoir tank.
Figure 14:
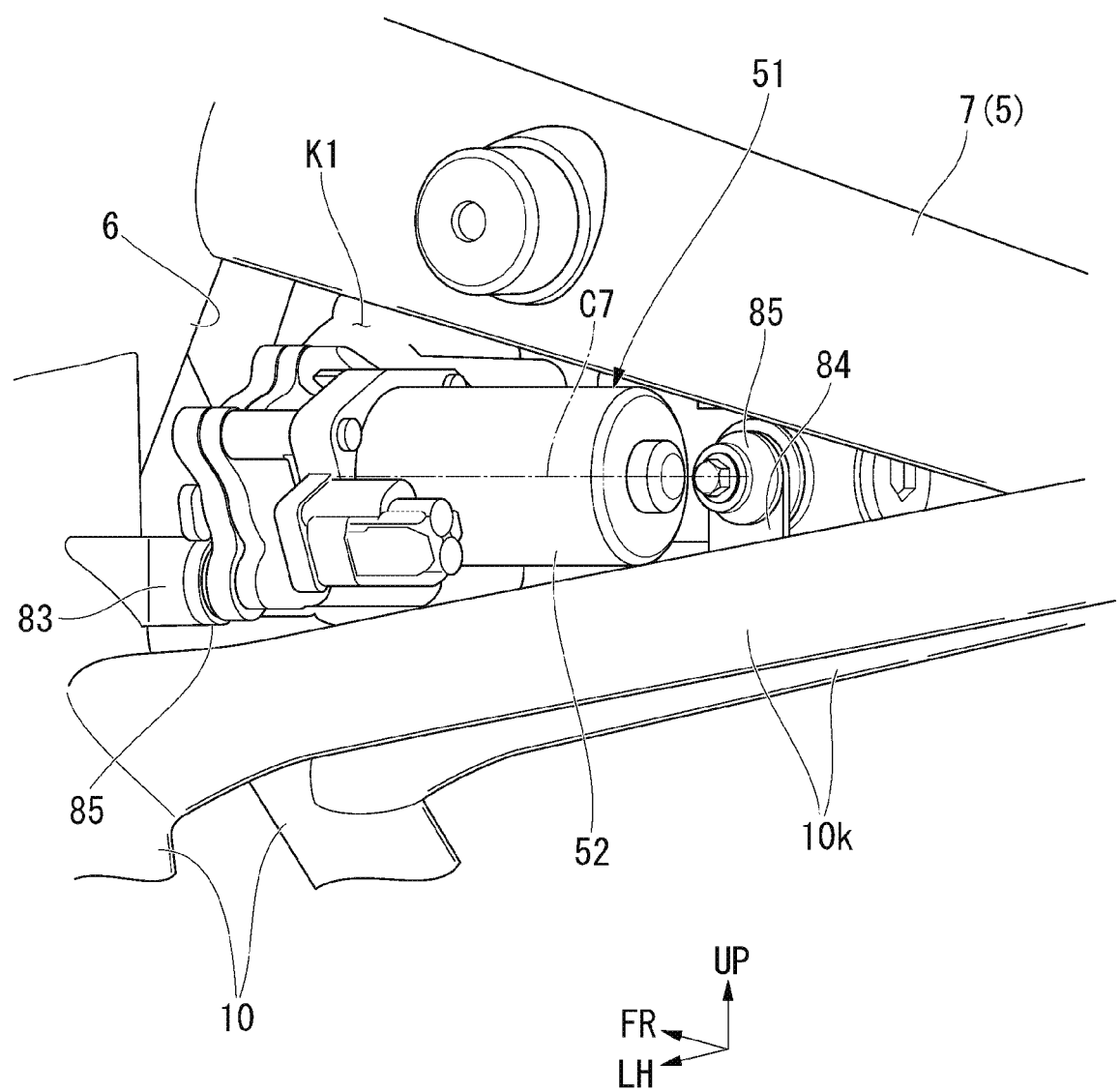
FIG. 14 is a perspective view of an attachment state of the hydraulic actuator when seen from a side to the rear and left thereof.
Figure 15:
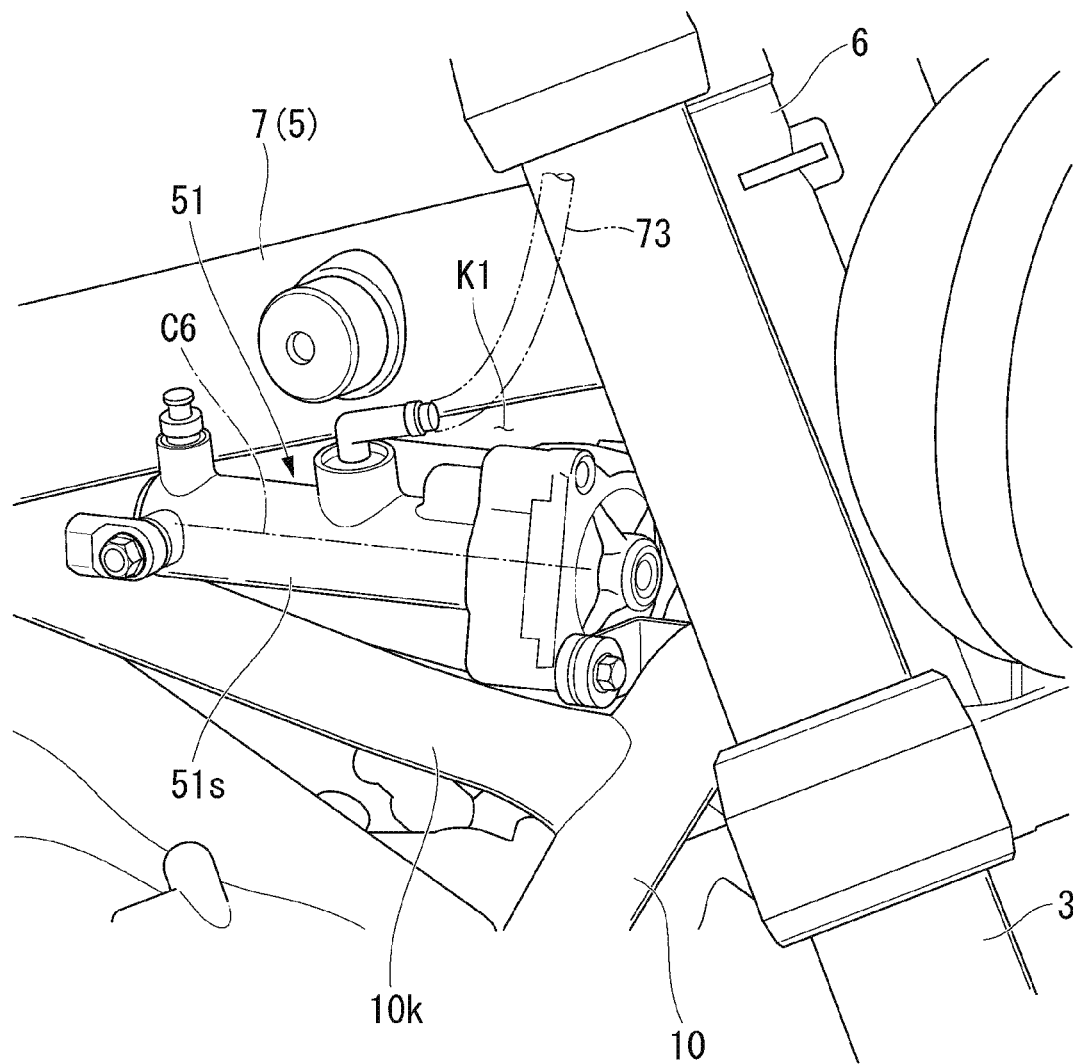
FIG. 15 is a perspective view of the attachment state of the hydraulic actuator when seen from a side in front and to the right thereof.

In addition, as shown in FIG. 13 to FIG. 15, the hydraulic actuator 51 is disposed on a peripheral section of the head pipe 6 (specifically, behind the head pipe 6 and below the front section of the main tube 7) provided on the front end portion of the vehicle body frame 5. The main tube 7 and the left and right down tubes 10 are provided such that an interval in the upward/downward direction is gradually increased as it goes rearward when seen in a side view, and left and right gusset pipes 10k extending to be inclined rearward and upward are provided between the front section of the main tube 7 and the upper sections of the left and right down tubes 10. The hydraulic actuator 51 is disposed in a space K1 surrounded by the head pipe 6, the front section of the main tube 7, the upper sections of the left and right down tubes 10, and the left and right gusset pipes 10k. The hydraulic actuator 51 is disposed such that at least a part thereof overlaps the head pipe 6, which is inclined so that an upper side thereof is located rearward, in both of the upward/downward direction and the forward/rearward direction. In addition, the hydraulic actuator 51 may be disposed such that at least a part thereof overlaps the head pipe 6 in the upward/downward direction and the forward/rearward direction.

The hydraulic actuator 51 is supported by stays 83 and 84 welded to the down tube 10 and the left and right gusset pipes 10k via a mount rubber 85. In the hydraulic actuator 51, the motor 52 and the master cylinder 51s are disposed parallel to each other. Reference characters C6 and C7 in the drawings designate central axes in extension directions of the motor 52 and the master cylinder 51s, respectively. The hydraulic actuator 51 is disposed such that the axes C6 and C7 of the motor 52 and the master cylinder 51s are directed in the vehicle forward/rearward direction. The hydraulic actuator 51 is disposed such that the motor 52 and the master cylinder 51s are arranged on left and right sides. Accordingly, the hydraulic actuator 51 is easily disposed in the space K1 having a triangular shape in which an up-to-down width is smaller than a front-to-rear width when seen in a side view.

The reservoir tank 51e in which a working fluid is accumulated is connected to the master cylinder 51s of the hydraulic actuator 51. The reservoir tank 51e is provided on a left half section of the steering handle 4a (specifically, an area adjacent to an inner side of a left grip section of the steering handle 4a in the vehicle width direction). A holder or the like of a clutch lever configured to manually operate the clutch is provided in this area in the case of the vehicle in which the clutch is manually operated. In the motorcycle 1 of the embodiment, since the clutch lever for a manual operation is unnecessary, the reservoir tank 51e is provided on a left half section of the steering handle 4a instead of the holder or the like of the clutch lever.

Referring to FIG. 1, the hydraulic valve unit 53 is disposed at a position closer to the slave cylinder 28 than the hydraulic actuator 51. In addition, the hydraulic valve unit 53 is disposed behind the hydraulic actuator 51.

The slave-side connecting pipeline 72 is shorter than the master-side connecting pipeline 71. In addition, a reserve pipeline 73 configured to connect the reservoir tank 51e and the hydraulic actuator 51 is shorter than the master-side connecting pipeline 71.

Here, the master-side connecting pipeline 71 is formed of a metal-based material, and the slave-side connecting pipeline 72 and the reserve pipeline 73 are formed of a rubber-based material.

That is, since the hydraulic actuator 51 and the hydraulic valve unit 53 are fixedly supported by the vehicle body frame 5 or the like to prevent relative movement, the master-side connecting pipeline 71 is constituted by a steel pipe or the like and loss in transmission of the hydraulic pressure can be minimized. In addition, since the slave cylinder 28 and the reservoir tank 51e are frequently moved during maintenance, it is preferable that they be constituted by a rubber hose having a degree of freedom of flexibility. In addition, when the reservoir tank 51e is handle-mounted, the reserve pipeline 73 requires a degree of freedom of flexibility.

Then, since the slave-side connecting pipeline 72 is formed of the rubber-based material, when the hydraulic pressure of the working fluid is decreased, the slave-side connecting pipeline 72 contracts immediately, and it can be expected that the hydraulic pressure is increased immediately and the hydraulic pressure is maintained.

As described above, the motorcycle 1 of the embodiment includes the vehicle body frame 5, the engine 13 suspended by the vehicle body frame 5, the gearbox 21 disposed behind the engine 13 in the vehicle forward/rearward direction and having the clutch 26 operated by actuation of the slave cylinder 28, the hydraulic actuator 51 having the master cylinder 51s configured to generate a hydraulic pressure in a working fluid, the hydraulic valve unit 53 separated from the hydraulic actuator 51 and configured to control transmission of the hydraulic pressure generated by the master cylinder 51s to the slave cylinder 28, the master-side connecting pipeline 71 configured to connect the master cylinder 51s of the hydraulic actuator 51 and the hydraulic valve unit 53, and the slave-side connecting pipeline 72 configured to connect the hydraulic valve unit 53 and the slave cylinder 28, wherein the hydraulic valve unit 53 is disposed at a position closer to the slave cylinder 28 than the hydraulic actuator 51.

According to the configuration, since the hydraulic valve unit 53 is disposed at a position closer to the slave cylinder 28 than the hydraulic actuator 51, the hydraulic pressure controlled by the hydraulic valve unit 53 can be rapidly transmitted to the slave cylinder 28, and operational responsiveness in hydraulic pressure control of the clutch 26 can be increased. In addition, since the hydraulic valve unit 53 and the hydraulic actuator 51 are separated from each other, a degree of freedom in disposition of the hydraulic valve unit 53 and the hydraulic actuator 51 can be increased.

In addition, in the motorcycle 1, the slave-side connecting pipeline 72 is shorter than the master-side connecting pipeline 71. Accordingly, the hydraulic pressure controlled by the hydraulic valve unit 53 can be rapidly transmitted to the slave cylinder 28, and operational responsiveness in hydraulic pressure control of the clutch 26 can be increased.

In addition, in the motorcycle 1, the hydraulic valve unit 53 is disposed behind the hydraulic actuator 51 in the vehicle forward/rearward direction. Accordingly, the hydraulic valve unit 53 can be disposed to approach the slave cylinder 28 in the vicinity of the gearbox 21 provided behind the cylinder 16 of the engine 13.

In addition, in the motorcycle 1, the hydraulic valve unit 53 is disposed behind the cylinder 16 of the engine 13 and above the gearbox 21. Accordingly, the hydraulic valve unit 53 can be efficiently disposed at a position close to the slave cylinder 28 while effectively using the available space around the engine 13.

In addition, in the motorcycle 1, the master-side connecting pipeline 71 is formed of the metal-based material, and the slave-side connecting pipeline 72 is formed of the rubber-based material. Accordingly, when the hydraulic pressure of the working fluid has decreased, the hydraulic pressure can be immediately increased as the slave-side connecting pipeline 72 contracts, and the hydraulic pressure can be maintained. In addition, since the master-side connecting pipeline 71 that is relatively long is formed of the metal-based material, loss in hydraulic pressure transmission due to expansion of the pipeline can be minimized.

In addition, in the motorcycle 1, the hydraulic actuator 51 is disposed in the section surrounding the head pipe 6 provided on the front end portion of the vehicle body frame 5. That is, the hydraulic actuator 51 is disposed so as to overlap the head pipe 6 provided on the front end portion of the vehicle body frame 5 in at least one of the upward/downward direction and the forward/rearward direction. Accordingly, the hydraulic actuator 51 can be efficiently disposed while effectively using the available space around the head pipe 6.

In addition, the motorcycle 1 further includes the reservoir tank 51e connected to the master cylinder 51s and in which a working fluid is accumulated, and the reservoir tank 51e is provided on the steering handle 4a that is provided to be pivotable with respect to the vehicle body frame 5. Accordingly, the reservoir tank 51e becomes closer to the driver's field of view, and for example, the amount of the working fluid can be easily seen, and maintenance properties can be improved.

In addition, the reservoir tank 51e of the motorcycle 1 is provided on the left half section of the steering handle 4a. Accordingly, the reservoir tank 51e can be provided by effectively using the space in which the clutch lever or the like is provided in the case of the vehicle in which the clutch is manually operated.

In addition, in the motorcycle 1, the reserve pipeline 73 configured to connect the reservoir tank 51e and the hydraulic actuator 51 is shorter than the master-side connecting pipeline 71. Accordingly, design properties can be improved by reducing the length of the reserve pipeline 73.

In addition, in the motorcycle 1, the hydraulic valve unit 53 has a dimension in the vehicle forward/rearward direction that is smaller than that in the vehicle width direction. Accordingly, the hydraulic valve unit 53 can be disposed at a position close to the slave cylinder 28 with a high degree of freedom while achieving effective use of a vehicle body space.

Further, the present invention is not limited to the above-mentioned embodiment described with reference to the accompanying drawings, various variants are considered within the technical scope thereof.

For example, the attachment positions of the hydraulic actuator 51 and the hydraulic valve unit 53 are not limited to the position exemplified in the embodiment, and they may be attached to an appropriate another place without departing from the scope of the present invention.

In addition, all vehicles on which a driver rides on the vehicle body are included as the saddle-type vehicle, and in addition to a motorcycle (including a motorized bicycle and a scooter-type vehicle), a three-wheeled vehicle (including a two-front-wheeled and one-rear-wheeled vehicle in addition to one-front-wheeled and two-rear-wheeled vehicle) or a four-wheeled vehicle may also be included, and a vehicle in which an electric motor is included in a prime mover may also be included.

Then, the configuration in the embodiment is an example of the present invention, and various modifications may be made without departing from the scope of the present invention.

REFERENCE SIGNS LIST

1 Motorcycle (saddle-type vehicle)
4a Steering handle
5 Vehicle body frame
6 Head pipe
13 Engine
16 Cylinder
26 Clutch
21 Gearbox
28 Slave cylinder
50 Clutch actuator
51 Hydraulic actuator
51s Master cylinder
51e Reservoir tank
53 Hydraulic valve unit
71 Master-side connecting pipeline
72 Slave-side connecting pipeline
73 Reserve pipeline

The invention claimed is:

1. A riding vehicle comprising:
a gearbox having a clutch operated by actuation of a slave cylinder;
a hydraulic actuator having a master cylinder configured to generate a hydraulic pressure in a working fluid;
a hydraulic valve unit configured to control transmission of the hydraulic pressure generated by the master cylinder to the slave cylinder;
a master-side connecting pipeline configured to connect the master cylinder and the hydraulic valve unit; and
a slave-side connecting pipeline configured to connect the hydraulic valve unit and the slave cylinder,
wherein the hydraulic valve unit is disposed at a position closer to the slave cylinder than the hydraulic actuator,
wherein the master-side connecting pipeline is formed of a metal-based material, and the slave-side connecting pipeline is formed of a rubber-based material,
the riding vehicle further comprising an engine continuous with a front side of the gearbox, and
wherein the hydraulic valve unit is disposed behind a cylinder of the engine and above the gearbox.

2. The riding vehicle according to claim 1, wherein the slave-side connecting pipeline is shorter than the master-side connecting pipeline.

3. The riding vehicle according to claim 1, wherein the hydraulic actuator is disposed so as to overlap a head pipe, which is provided on a front end portion of the vehicle body frame, in at least one of an upward/downward direction and a forward/rearward direction.

4. The riding vehicle according to claim 3, further comprising a reservoir tank connected to the master cylinder and in which the working fluid is accumulated,
wherein the reservoir tank is attached to a steering handle provided to be pivotable with respect to the vehicle body frame.

5. The riding vehicle according to claim 4, wherein the reservoir tank is attached to a left half section of the steering handle.

6. The riding vehicle according to claim 4, wherein a reserve pipeline configured to connect the reservoir tank and the hydraulic actuator is shorter than the master-side connecting pipeline.

7. A riding vehicle comprising:
- a gearbox having a clutch operated by actuation of a slave cylinder;
- a hydraulic actuator having a master cylinder configured to generate a hydraulic pressure in a working fluid;
- a hydraulic valve unit configured to control transmission of the hydraulic pressure generated by the master cylinder to the slave cylinder;
- a master-side connecting pipeline configured to connect the master cylinder and the hydraulic valve unit; and
- a slave-side connecting pipeline configured to connect the hydraulic valve unit and the slave cylinder,
- wherein the hydraulic valve unit is disposed at a position closer to the slave cylinder than the hydraulic actuator,
- wherein the master-side connecting pipeline is formed of a metal-based material, and the slave-side connecting pipeline is formed of a rubber-based material, and
- wherein the hydraulic actuator is disposed so as to overlap a head pipe, which is provided on a front end portion of the vehicle body frame, in at least one of an upward/downward direction and a forward/rearward direction.

* * * * *